(12) United States Patent
Li et al.

(10) Patent No.: US 10,813,129 B2
(45) Date of Patent: Oct. 20, 2020

(54) METHOD AND APPARATUS FOR SENDING AND RECEIVING UPLINK DATA, TERMINAL, AND BASE STATION

(71) Applicant: ZTE CORPORATION, Shenzhen (CN)

(72) Inventors: Xincai Li, Shenzhen (CN); Yajun Zhao, Shenzhen (CN); Wei Gou, Shenzhen (CN); Focai Peng, Shenzhen (CN); Feng Bi, Shenzhen (CN); Ling Yang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/070,874

(22) PCT Filed: Jan. 18, 2017

(86) PCT No.: PCT/CN2017/071580
§ 371 (c)(1),
(2) Date: Jul. 18, 2018

(87) PCT Pub. No.: WO2017/125022
PCT Pub. Date: Jul. 27, 2017

(65) Prior Publication Data
US 2019/0029046 A1    Jan. 24, 2019

(30) Foreign Application Priority Data
Jan. 20, 2016    (CN) .......................... 2016 1 0038891

(51) Int. Cl.
*H04W 74/08*    (2009.01)
*H04W 16/14*    (2009.01)
(Continued)

(52) U.S. Cl.
CPC ....... *H04W 74/0816* (2013.01); *H04L 1/0003* (2013.01); *H04L 5/0044* (2013.01);
(Continued)

(58) Field of Classification Search
CPC ... H04L 1/0003; H04L 5/0044; H04L 5/0048; H04L 5/005; H04L 5/0051; H04L 5/0053;
(Continued)

(56) References Cited

U.S. PATENT DOCUMENTS 8,369,302 B2    2/2013  Dai et al.
9,980,257 B2 *  5/2018  Chen ................ H04W 72/0413
(Continued)

FOREIGN PATENT DOCUMENTS

CN    101719888 A    6/2010
CN    101902301 A    12/2010
(Continued)

OTHER PUBLICATIONS

International Search Report in international application No. PCT/CN2017/071580, dated Mar. 22, 2017, 2 pgs.
(Continued)

*Primary Examiner* — Eric Nowlin
(74) *Attorney, Agent, or Firm* — Li & Cai Intellectual Propeny (USA) Office

(57) ABSTRACT

A method and apparatus for sending and receiving uplink data, a terminal, and a base station are provided. The method comprises: determining, according to a self-defined instruction message or an instruction message received from a base station, a start symbol position or the start symbol position and an end symbol position for transmitting a subframe on a physical uplink shared channel (PUSCH) on an unlicensed carrier; and sending uplink data according to the start symbol position or according to the start symbol position and the end symbol position. By means of the embodiments
(Continued)

A start symbol location or start and end symbol locations of a PUSCH transmission subframe on an unlicensed carrier are determined through a predefinition or according to an indication message received from a base station    ⟋ S102

UL data is sent according to the determined start symbol location or start and end symbol locations    ⟋ S104 of the present invention, the problem of failing to determine the time point of transmitting uplink data on an unlicensed carrier by a terminal is resolved, thereby achieving the effect of determining the time point of transmitting the uplink data on the unlicensed carrier by the terminal, and providing the effect of improving the data transmission efficiency.

19 Claims, 19 Drawing Sheets

(51) Int. Cl.

| | | |
|---|---|---|
| *H04L 5/00* | (2006.01) | |
| *H04L 1/00* | (2006.01) | |
| *H04L 25/02* | (2006.01) | |
| *H04L 27/26* | (2006.01) | |
| *H04W 72/04* | (2009.01) | |
| *H04W 72/12* | (2009.01) | |

(52) U.S. Cl.
CPC ........ *H04L 5/0094* (2013.01); *H04L 25/0224* (2013.01); *H04L 27/2607* (2013.01); *H04W 16/14* (2013.01); *H04W 72/0413* (2013.01); *H04W 72/0446* (2013.01); *H04W 72/1268* (2013.01); *H04L 5/0051* (2013.01); *H04W 74/0808* (2013.01)

(58) Field of Classification Search
CPC ............. H04L 25/0224; H04L 27/2607; H04L 27/2613; H04W 16/14; H04W 72/0413; H04W 72/0446; H04W 72/1268; H04W 74/0816
See application file for complete search history.

(56) References Cited

U.S. PATENT DOCUMENTS

| | | | |
|---|---|---|---|
| 10,212,606 B2 | 2/2019 | Gou et al. | |
| 10,574,515 B2 | 2/2020 | Kim et al. | |
| 10,575,184 B2 | 2/2020 | Gou et al. | |
| 2012/0250631 A1 | 10/2012 | Hakola | |
| 2015/0181589 A1* | 6/2015 | Luo | H04L 5/0048 370/329 |
| 2015/0358981 A1* | 12/2015 | Chae | H04L 25/02 370/252 |
| 2016/0029371 A1* | 1/2016 | Yang | H04W 72/1268 370/329 |
| 2016/0174215 A1* | 6/2016 | Zhang | H04W 72/14 370/329 |
| 2016/0183296 A1* | 6/2016 | Yerramalli | H04W 74/004 370/329 |
| 2017/0006626 A1 | 1/2017 | Lin et al. | |
| 2019/0037565 A1* | 1/2019 | Zheng | H04W 72/1263 |
| 2019/0191453 A1* | 6/2019 | Xiong | H04L 5/0037 |
| 2019/0274137 A1* | 9/2019 | Bhattad | H04W 74/004 |

FOREIGN PATENT DOCUMENTS

| | | |
|---|---|---|
| CN | 102648646 A | 8/2012 |
| CN | 104301273 A | 1/2015 |
| CN | 104796920 A | 7/2015 |
| CN | 104812032 A | 7/2015 |
| CN | 105162562 A | 12/2015 |
| CN | 105162563 A | 12/2015 |
| WO | WO 2015186989 A1 | 12/2015 |

OTHER PUBLICATIONS

English Translation of the Written Opinion of the International Search Authority in international application No. PCT/CN2017/071580, dated Mar. 22, 2017, 6 pgs.

China Patent Office, First Office Action dated Dec. 25, 2019 regarding China patent application No. CN201610038891.9.

\* cited by examiner

METHOD AND APPARATUS FOR SENDING AND RECEIVING UPLINK DATA, TERMINAL, AND BASE STATION

TECHNICAL FIELD

The disclosure relates to the field of communication, and particularly to methods and devices for sending and receiving Uplink (UL) data, a terminal and a base station.

BACKGROUND

In an evolution process of Long-Term Evolution (LTE), a project for researches on LTE Release-13 (Rel-13) was set up in September 2014, and an important content is use of unlicensed carriers for work of LTE systems. This technology may make an existing unlicensed carrier available for an LTE system, greatly improve potential spectrum resources of the LTE system and enable the LTE system to achieve lower spectrum cost.

For use of an unlicensed carrier for work of an LTE system, some control requirements need to be met. For example, a station is required to implement Listen Before Talk (LBT) (also called Clear Channel Assessment (CCA)) before data transmission and may perform UL data transmission only after a success. Physical Uplink Shared Channel (PUSCH) transmission on a licensed carrier is usually started from a subframe symbol 0. For an unlicensed carrier, a moment when a terminal successfully implements LBT is undetermined, so that a data transmission starting moment may also not be determined.

For the problem of incapability of determining a moment when a terminal transmits UL data on an unlicensed carrier in a related art, there is yet no effective solution at present.

SUMMARY

Embodiments of the disclosure provide methods and devices for sending and receiving UL data, a terminal and a base station, so as at least to solve the problem of incapability of determining a moment when a terminal transmits UL data on an unlicensed carrier in the related art.

According to an aspect of the embodiments of the disclosure, there is provided a method for sending UL data, which may include that: a start symbol location or start and end symbol locations of a PUSCH transmission subframe on an unlicensed carrier are determined through a predefinition or according to an indication message received from a base station; and UL data is sent according to the determined start symbol location or start and end symbol locations.

Optionally, the start and end symbol locations of the PUSCH transmission subframe may include at least one of the following: for a normal cyclic prefix format, the start symbol location of the PUSCH transmission subframe may include one of symbols {0}, {1}, {0, 7}, {1, 7}, {2, 7} or {0, 3, 7, 10} and the end symbol location of the PUSCH transmission subframe may include one of symbols {5}, {6}, {13}, {12} or {7, 13}; or, for an extended cyclic prefix format, the start symbol location of the PUSCH transmission subframe may include one of symbols {0}, {1}, {0, 6}, {1, 6}, {2, 6} or 10, 2, 6, 81 and the end symbol location of the PUSCH transmission subframe may include one of symbols {4}, {5}, {11}, {10} or {5, 11}.

Optionally, the indication message may include at least one of scheduling indication information, signaling indication information, a Radio Resource Control (RRC) message or Downlink Control Information (DCI); and optionally, the PUSCH transmission subframe may be located on a transmission subframe indicated by the scheduling indication information or signaling indication information comprised in the indication message from the base station, and/or the PUSCH transmission subframe may be located on n subfames before or after a transmission subframe indicated by the scheduling indication information or signaling indication information comprised in the indication message, where 1≤n<4.

Optionally, before the operation that the UL data is sent according to the determined start symbol location or start and end symbol locations, the method may further include that: a DeModulation Reference Signal (DMRS) is generated; and the generated DMRS is mapped onto a symbol corresponding to the PUSCH transmission subframe corresponding to the start symbol location, herein when the start symbol location of the PUSCH transmission subframe is the symbol 7, a symbol location to which the DMRS is mapped may be the symbol 10; when the start symbol location of the PUSCH transmission subframe is the symbol 3, the symbol location to which the DMRS is mapped may be the symbol 3 and the symbol 10 or the symbol location to which the DMRS is mapped may be the symbol 6 and the symbol 10; when the start symbol location of the PUSCH transmission subframe is the symbol 1, the symbol location to which the DMRS is mapped may be the symbol 3 and the symbol 10; and when the start symbol location of the PUSCH transmission subframe is the symbol 2, the symbol location to which the DMRS is mapped may be the symbol 3 and the symbol 10 or the symbol 5 and the symbol 10.

Optionally, when the symbol location to which the DMRS is mapped is the symbol 5 or the symbol 6, a root sequence index of the DMRS may be determined according to an even time slot, and a value of a sequence cyclic shift $n_{PRS}$ of the DMRS may be determined according to the even time slot.

Optionally, the operation that the start symbol location or start and end symbol locations of the PUSCH transmission subframe on the unlicensed carrier are determined through the predefinition or according to the indication message received from the base station may include that: a candidate start symbol location or candidate start and end symbol locations of the PUSCH transmission subframe on the unlicensed carrier are determined through the predefinition or according to the indication message received from the base station; and the start symbol location or start and end symbol locations of the PUSCH transmission subframe are selected from among the candidate start symbol location or candidate start and end symbol locations of the PUSCH transmission subframe according to a moment when CCA is successfully implemented.

Optionally, before the operation that the start symbol location or start and end symbol locations of the PUSCH transmission subframe are selected from among the candidate start symbol location or candidate start and end symbol locations of the PUSCH transmission subframe according to the moment when CCA is successfully implemented, the method may further include that: CCA is implemented in the following manners: CCA is implemented at any moment of first m subframes of transmission subframes indicated by the scheduling indication information comprised in the indication message from the base station, where 1≤m<4, or CCA is started to be implemented from a starting boundary of the transmission subframe indicated by the scheduling indication information comprised in the indication message from the base station; and the operation that the start symbol location or start and end symbol locations of the PUSCH transmission subframe are selected from among the candidate start symbol location or candidate start and end symbol locations of the PUSCH transmission subframe according to the moment when CCA is successfully implemented may include that: a candidate start symbol location closest to the moment when CCA is successfully implemented is determined as a final start symbol location of the PUSCH transmission subframe, or the candidate start symbol location closest to the moment when CCA is successfully implemented is determined as the final start symbol location of the PUSCH transmission subframe and a final end symbol location is determined according to the final start symbol location.

Optionally, after the operation that CCA is implemented, the method may further include that: when the moment when CCA is successfully implemented does not reach the closest candidate start symbol location, an occupancy signal or a Reference Signal (RS) is sent, herein the RS may include at least one of a preamble, a DMRS or a Sounding Reference Signal (SRS), and the occupancy signal or the RS may be used by the base station to perform at least one of demodulating a PUSCH or notifying the base station or another terminal that the channel has been occupied.

Optionally, the operation that the UL data is sent according to the determined start symbol location or start and end symbol locations may include that: a number of symbols, arranged for data transmission, of the PUSCH transmission subframe is determined; and the UL data is sent according to the determined number of symbols.

Optionally, an UL data Transport Block Size (TBS) of an incomplete subframe corresponding to a start symbol may be determined through at least one of the following ways: Physical Resource Blocks (PRBs) and modulation and coding information parameter $I_{MCS}$ both corresponding to the incomplete subframe corresponding to the start symbol are determined according to the scheduling indication information comprised in the indication message received from the base station and the TBS corresponding to the incomplete subframe corresponding to the start symbol is determined according to the determined PRBs and parameter $I_{MCS}$; or PRBs and modulation and coding information parameter $I_{MCS}$ corresponding to a complete subframe are determined according to the scheduling indication information comprised in the indication message received from the base station and the TBS corresponding to the incomplete subframe is determined according to the determined PRBs, conversion rule and parameter $I_{MCS}$ corresponding to the complete subframe.

Optionally, the conversion rule may include at least one of the following rules: when the start symbol location of the PUSCH transmission subframe is the symbol 7, the TBS corresponding to the incomplete subframe is determined according to the number of the PRBs that is a half of the number of PRBs indicated in the scheduling indication signaling and according to $I_{MCS}$ indicated by the scheduling indication signaling; when the start symbol location of the PUSCH transmission subframe is the symbol 3, the TBS corresponding to the incomplete subframe is determined according to an integral number of PRBs obtained by rounding up or rounding down 7/12 of the PRBs indicated in the scheduling indication signaling and $I_{MCS}$ indicated in the scheduling indication signaling; when the start symbol location of the PUSCH transmission subframe is the symbol 1 or the symbol 2, the TBS corresponding to the incomplete subframe is determined according to the number of the PRBs indicated in the scheduling indication signaling and $I_{MCS}$ indicated in the scheduling indication signaling; and a TBS determined according to m/12 of the PRBs indicated in the scheduling indication signaling and $I_{MCS}$ indicated in the scheduling indication signaling is determined as a temporary TBS and then a TBS closest to the temporary TBS is found from a TBS table as the TBS corresponding to the incomplete subframe, herein m may be a number of symbols, arranged for data transmission, in the incomplete subframe.

Optionally, when the PUSCH transmission subframe is a periodic or aperiodic SRS transmission subframe, the SRS may be located on a last symbol of a first time slot of the PUSCH, or a first symbol or last symbol or second last symbol of a second time slot of the PUSCH.

Optionally, when Uplink Control Information (UCI) and service data are multiplexed on the same subframe for transmission, resource mapping may include at least one of the following: when the start symbol location of the PUSCH transmission subframe is the symbol 7, a calculation of a PRB resource mapping index of the UCI starts from the second time slot; when the start symbol location of the PUSCH transmission subframe is the symbol 3, at least one of an Acknowledgment (ACK) or Negative Acknowledgment (NACK) of the UCI starts to be mapped from the symbol 4 and is mapped onto part of Resource Blocks (RBs) of the PUSCH of the symbol 4 and the symbol 6 and part of RBs of the PUSCH of the symbol 9 and symbol 11 of the second time slot; a Rank Indicator (RI) in the UCI starts to be mapped from the symbol 3 and is mapped onto the symbol 3, the symbol 7 and part of PRBs of the PUSCH in the symbol 8 and the symbol 12; and at least one of a Channel Quality Indicator (CQI) or Precoding Matrix Indicator (PMI) in the UCI starts to be mapped from a location of a first PRB of PRBs on the symbol 3, which are indicated by the scheduling indication information from the base station.

Optionally, when at least one of the SRS or the UCI is transmitted on the incomplete subframe in the PUSCH transmission subframe, a resource location corresponding to at least one of the SRS or the UCI may be punched during service data resource mapping.

According to another aspect of the embodiments of the disclosure, there is further provided a method for receiving UL data, which may include that: an indication message is sent to a terminal, herein the indication message may be arranged to indicate at least one of the following information: a candidate start symbol location or candidate start and end symbol locations of a PUSCH transmission subframe of a terminal on an unlicensed carrier, or a transmission subframe; a start symbol location or start and end symbol locations, selected by the terminal according to the indication message, of the PUSCH transmission subframe are determined; and UL data is received according to the start symbol location or start and end symbol locations, selected by the terminal, of the PUSCH transmission subframe.

Optionally, the start and end symbol locations of the PUSCH transmission subframe may include at least one of the following: for a normal cyclic prefix format, the start symbol location of the PUSCH transmission subframe may include one of symbols {0}, {1}, {0, 7}, {1, 7}, {2, 7} or {0, 3, 7, 10} and the end symbol location of the PUSCH transmission subframe may include one of symbols {5}, {6}, {13}, {12} or {7, 13}; or, for an extended cyclic prefix format, the start symbol location of the PUSCH transmission subframe may include one of symbols {0}, {1}, {0, 6}, {1, 6}, {2, 6} or 10, 2, 6, 81 and the end symbol location of the PUSCH transmission subframe may include one of symbols {4}, {5}, {11}, {10} or {5, 11}.

Optionally, the indication message may include at least one of scheduling indication information, signaling indication information, an RRC message and DCI.

Optionally, the operation that the start symbol location or start and end symbol locations, selected by the terminal according to the indication message, of the PUSCH transmission subframe are determined may include that: the start symbol location or start and end symbol locations, selected by the terminal, of the PUSCH transmission subframe is determined in at least one of the following manners: blind detection, determination through an occupancy signal or RS sent by the terminal, or determination through a DMRS sent by the terminal.

According to an aspect of the embodiments of the disclosure, there is provided a device for sending UL data sending device is provided, which may include: a first determination module, arranged to determine a start symbol location or start and end symbol locations of a PUSCH transmission subframe on an unlicensed carrier through a predefinition or according to an indication message received from a base station; and a transmission module, arranged to send UL data according to the determined start symbol location or start and end symbol locations.

According to another aspect of the embodiments of the disclosure, there is provided a device for receiving UL data, which may include: a sending module, arranged to send an indication message to a terminal, herein the indication message may be arranged to indicate at least one of the following information: a candidate start symbol location or candidate start and end symbol locations of a PUSCH transmission subframe of a terminal on an unlicensed carrier, or a transmission subframe; a second determination module, arranged to determine a start symbol location or start and end symbol locations, selected by the terminal according to the indication message, of the PUSCH transmission subframe; and a receiving module, arranged to receive UL data according to the start symbol location or start and end symbol locations, selected by the terminal, of the PUSCH transmission subframe.

According to an aspect of the embodiments of the disclosure, there is provided a terminal, which may include the abovementioned device for sending UL data.

According to an aspect of the embodiments of the disclosure, a base station is provided, which may include the abovementioned device for receiving UL data.

Another embodiment of the disclosure provides a computer storage medium, which stores an executable instruction, the executable instruction being arranged to implement one or combination of the operations in the abovementioned method embodiments.

According to the disclosure, the start symbol location or start and end symbol locations of the PUSCH transmission subframe on the unlicensed carrier are determined through the predefinition or according to the indication message received from the base station; and the UL data is sent according to the determined start symbol location or start and end symbol locations. The problem of incapability of determining a moment when a terminal transmits UL data on an unlicensed carrier in the related art is solved, and a purpose of determining the moment when the terminal transmits the UL data on the unlicensed carrier and an effect of improving data transmission efficiency are further achieved.

BRIEF DESCRIPTION OF DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

The disclosure will be described below with reference to the drawings and in combination with the embodiments in detail. It is to be noted that the embodiments in the application and characteristics in the embodiments may be combined without conflicts.

It is to be noted that terms "first", "second" and the like in the specification, claims and drawings of the disclosure are adopted not to describe a specific sequence or order but to distinguish similar objects.

Figure 1:
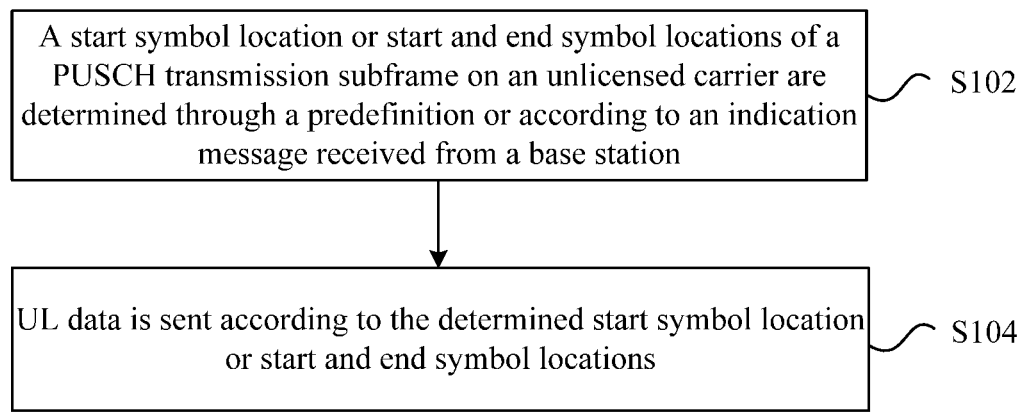
FIG. 1 is a flowchart of a method for sending UL data according to an embodiment of the disclosure.

An embodiment provides a method for sending UL data. FIG. 1 is a flowchart of a method for sending UL data according to an embodiment of the disclosure. As shown in FIG. 1, the flow includes the following operations.

In S102, a start symbol location or start and end symbol locations of a PUSCH transmission subframe on an unlicensed carrier are determined through a predefinition or according to an indication message received from a base station.

In S104, UL data is sent according to the determined start symbol location or start and end symbol locations.

An implementor of the operations in the embodiment may be a terminal.

By the operations, before the UL data is sent, a location of the PUSCH transmission subframe on the unlicensed carrier is determined at first according to the predefinition or the indication message of the base station, and then a moment when the terminal transmits the UL data on the unlicensed carrier may be learned. Therefore, the problem of incapability of the moment when the terminal transmits the UL data on the unlicensed carrier in the related art is solved, and a purpose of determining the moment when the terminal transmits the UL data on the unlicensed carrier and an effect of improving data transmission efficiency are further achieved.

In an optional embodiment, the start and end symbol locations of the PUSCH transmission subframe include at least one of the following. For a normal cyclic prefix format, the start symbol location of the PUSCH transmission subframe includes one of symbols {0}, {1}, {0, 7}, {1, 7}, {2, 7} or {0, 3, 7, 10} and the end symbol location of the PUSCH transmission subframe includes one of symbols {5}, {6}, {13}, {12} or {7, 13}. Or, for an extended cyclic prefix format, the start symbol location of the PUSCH transmission subframe includes one of symbols {0}, {1}, {0, 6}, {1, 6}, {2, 6} or {0, 2, 6, 8} and the end symbol location of the PUSCH transmission subframe includes one of symbols {4}, {5}, {11}, {10} or {5, 11}. It is to be noted that the start symbol locations and end symbol locations, listed above, of the PUSCH transmission subframe are only some examples and other symbol locations may also be used as the start symbol location and/or end symbol location of the PUSCH transmission subframe. Examples will not be listed one by one herein.

In an optional embodiment, the indication message may include at least one of scheduling indication information, signaling indication information, an RRC message and DCI. The indication message may contain the start symbol location or start and end symbol locations of the PUSCH transmission subframe. Optionally, when being born through the DCI, the start symbol location or the start symbol location and the end symbol location may be born through an UL index or Downlink Assignment Index (DAI) domain in an existing DCI format 0 or 4 or born through dedicated signaling in format 1C. Preferably, the scheduling indication information may at least include frequency-domain location indication information and modulation and coding information $I_{MCS}$ for PUSCH transmission.

From the abovementioned embodiments, it can be seen that the terminal may determine the location of the PUSCH transmission subframe through the predefinition or the indication message received from the base station. In an optional embodiment, the terminal may preferably determine the location of the PUSCH transmission subframe according to the indication message from the base station and, when the terminal does not receive the indication message of the base station, may determine the start and end symbol locations of the PUSCH transmission subframe according to the system predefinition.

In an optional embodiment, the PUSCH transmission subframe is located on a transmission subframe indicated by the scheduling indication information or signaling indication information comprised in the indication message from the base station, and/or the PUSCH transmission subframe is located on n subfames before or after a the transmission subframe indicated by the scheduling indication information or signaling indication information comprised in the indication message, where $1 \le n < 4$. The indication message may include the scheduling indication information and the signaling indication information.

In an optional embodiment, before the operation that the UL data is sent according to the determined start symbol location or start and end symbol locations, the method further includes the following operations. A DMRS is generated. The generated DMRS is mapped onto a symbol corresponding to the PUSCH transmission subframe corresponding to the start symbol location. When the start symbol location of the PUSCH transmission subframe is the symbol 7, a symbol location to which the DMRS is mapped is the symbol 10. When the start symbol location of the PUSCH transmission subframe is the symbol 3, the symbol location to which the DMRS is mapped is the symbol 3 and the symbol 10 or the symbol location to which the DMRS is mapped is the symbol 6 and the symbol 10. When the start symbol location of the PUSCH transmission subframe is the symbol 1, the symbol location to which the DMRS is mapped is the symbol 3 and the symbol 10. When the start symbol location of the PUSCH transmission subframe is the symbol 2, the symbol location to which the DMRS is mapped is the symbol 3 and the symbol 10 or the symbol 5 and the symbol 10.

In an optional embodiment, when the symbol location to which the DMRS is mapped is the symbol 5 or the symbol 6, a root sequence index of the DMRS is determined according to an even time slot, and a value of a sequence cyclic shift $n_{PRS}$ of the DMRS is determined according to the even time slot.

In an optional embodiment, the operation that the start symbol location or start and end symbol locations of the PUSCH transmission subframe on the unlicensed carrier are determined through the predefinition or according to the indication message received from the base station includes the following operations. A candidate start symbol location or candidate start and end symbol locations of the PUSCH transmission subframe on the unlicensed carrier are determined through the predefinition or according to the indication message received from the base station. The start symbol location or start and end symbol locations of the PUSCH transmission subframe are selected from among the candidate start symbol location or candidate start and end symbol locations of the PUSCH transmission subframe according to a moment when CCA is successfully implemented. That is, the candidate start symbol location or the candidate start and end symbol locations may be determined through the system predefinition or the indication message of the base station, and then the start symbol location finally to be used or the start and end symbol locations finally to be used may be selected from among the candidate start symbol location or the candidate start symbol location and the end symbol location according to the moment when CCA is successfully implemented.

In an optional embodiment, before the operation that the start symbol location or start and end symbol locations of the PUSCH transmission subframe are selected from among the candidate start symbol location or candidate start and end symbol locations of the PUSCH transmission subframe according to the moment when CCA is successfully implemented, the method further includes that: CCA is implemented. The operation that CCA is implemented includes the following operations. CCA is implemented at any moment of first m subframes of transmission subframes indicated by the scheduling indication information comprised in the indication message from the base station, where 1≤m<4. Or, CCA is started to be implemented from a starting boundary of the transmission subframe indicated by the scheduling indication information comprised in the indication message from the base station. Optionally, the moment when CCA is implemented may further include at least one of the following: CCA is started to be implemented from any moment after an UL grant is received, or CCA is started to be implemented from any moment after a previous subframe of a scheduling subframe where PUSCH transmission is located, or CCA is started to be implemented from a last one or last two symbols of the previous subframe of the scheduling subframe or CCA is started to be implemented from a start symbol of the scheduling subframe where the PUSCH is located. It is to be noted that the moments, listed herein, when CCA is implemented are only two examples and specific time when CCA is implemented may also be determined according to a practical requirement. In an optional embodiment, the operation that the start symbol location or start and end symbol locations of the PUSCH transmission subframe are selected from among the candidate start symbol location or candidate start and end symbol locations of the PUSCH transmission subframe according to the moment when CCA is successfully implemented includes that: a candidate start symbol location closest to the moment when CCA is successfully implemented is determined as a final start symbol location of the PUSCH transmission subframe, or the candidate start symbol location closest to the moment when CCA is successfully implemented is determined as the final start symbol location of the PUSCH transmission subframe and a final end symbol location is determined according to the final start symbol location.

In an optional embodiment, after the operation that CCA is implemented, the method further includes that: when the moment when CCA is successfully implemented does not reach the closest candidate start symbol location, an occupancy signal or an RS is sent. The RS includes at least one of a preamble, a DMRS or an SRS. The occupancy signal or the RS is used by the base station to perform at least one of demodulating a PUSCH or notifying the base station or another terminal that the channel has been occupied.

In an optional embodiment, the operation that the UL data is sent according to the determined start symbol location or start and end symbol locations includes the following operations. The number of symbols, arranged for data transmission, of the PUSCH transmission subframe is determined. The UL data is sent according to the determined number of symbols. Optionally, when there is more than one candidate start symbol location of the PUSCH transmission subframe, the terminal is required to prepare PUSCH coding and modulation data copies in a number the same as the number of the start symbol locations.

In an optional embodiment, an UL data TBS of an incomplete subframe corresponding to a start symbol is determined through at least one of the following ways. A first way: PRBs and modulation and coding information parameter $I_{MCS}$ both corresponding to the incomplete subframe corresponding to the start symbol are determined according to the scheduling indication information comprised in the indication message received from the base station and the TBS corresponding to the incomplete subframe corresponding to the start symbol is determined according to the determined PRBs and parameter $I_{MCS}$. A second way: PRBs and modulation and coding information parameter $I_{MCS}$ corresponding to a complete subframe are determined according to the scheduling indication information comprised in the indication message received from the base station and the TBS corresponding to the incomplete subframe is determined according to the determined PRBs, conversion rule and parameter $I_{MCS}$ corresponding to the complete subframe. In the first method, the scheduling indication information indicates PRBs and $I_{MCS}$ corresponding to all the candidate start symbol locations of the PUSCH transmission subframe and the terminal may determine a TBS corresponding to each start symbol location of the PUSCH transmission subframe according to the information provided by the base station. In the second method, the scheduling indication information only indicates $I_{MCS}$ and PRBs corresponding to the complete subframe but a start symbol of the PUSCH transmission subframe may not be a complete subframe, and then the TBS corresponding to the start symbol may be determined according to the conversion rule when being determined.

In an optional embodiment, the conversion rule may include at least one of the following rules. When the start symbol location of the PUSCH transmission subframe is the symbol 7, the TBS corresponding to the incomplete subframe is determined according to the number of the PRBs that is a half of the number of PRBs indicated in the scheduling indication signaling and according to $I_{MCS}$ indicated by the scheduling indication signaling. When the start symbol location of the PUSCH transmission subframe is the symbol 3, the TBS corresponding to the incomplete subframe is determined according to an integral number of PRBs obtained by rounding up or rounding down 7/12 of the PRBs indicated in the scheduling indication signaling and $I_{MCS}$ indicated in the scheduling indication signaling. When the start symbol location of the PUSCH transmission subframe is the symbol 1 or the symbol 2, the TBS corresponding to the incomplete subframe is determined according to the number of the PRBs indicated in the scheduling indication signaling and $I_{MCS}$ indicated in the scheduling indication signaling. A TBS determined according to m/12 of the PRBs indicated in the scheduling indication signaling and $I_{MCS}$ indicated in the scheduling indication signaling is determined as a temporary TBS and then a TBS closest to the temporary TBS is found from a TBS table as the TBS corresponding to the incomplete subframe, m being a number of symbols, arranged for data transmission, in the incomplete subframe. Optionally, when the start symbol location of the PUSCH transmission subframe is the symbol 0, the TBS may be determined according to a solution in the related art.

In an optional embodiment, when the PUSCH transmission subframe is a periodic or aperiodic SRS transmission subframe, the SRS is located on a last symbol of a first time slot of the PUSCH, or a first symbol or last symbol or second last symbol of a second time slot of the PUSCH.

In an optional embodiment, the UL data may include UCI and/or service data. Optionally, when the UCI and the service data are multiplexed on the same subframe for transmission, resource mapping includes at least one of the following. When the start symbol location of the PUSCH transmission subframe is the symbol 7, the calculation of a PRB resource mapping index of the UCI starts from the second time slot. When the start symbol location of the PUSCH transmission subframe is the symbol 3, at least one of an ACK or NACK of the UCI starts to be mapped from the symbol 4 and is mapped onto part of RBs of the PUSCH of the symbol 4 and the symbol 6 and part of RBs of the PUSCH of the symbol 9 and symbol 11 of the second time slot. An RI in the UCI starts to be mapped from the symbol 3 and is mapped onto the symbol 3, the symbol 7 and part of PRBs of the PUSCH in the symbol 8 and the symbol 12. At least one of a CQI or PMI in the UCI starts to be mapped from a location of a first PRB of PRBs on the symbol {3}, which are indicated by the scheduling indication information from the base station. That is, when the PUSCH transmits the UCI, ACK and/or NACK information is mapped to adjacent symbol locations on two sides of a symbol for the DMRS, the RI is mapped to symbol locations spaced by a symbol respectively on the two sides of the symbol where the DMRS is located, and the CQI and the PMI are started to be mapped from the first RB allocated by the first symbol where PUSCH transmission is started.

In an optional embodiment, when at least one of the SRS or the UCI is transmitted on the incomplete subframe in the PUSCH transmission subframe, a resource location corresponding to at least one of the SRS or the UCI is punched during service data resource mapping.

Figure 2:
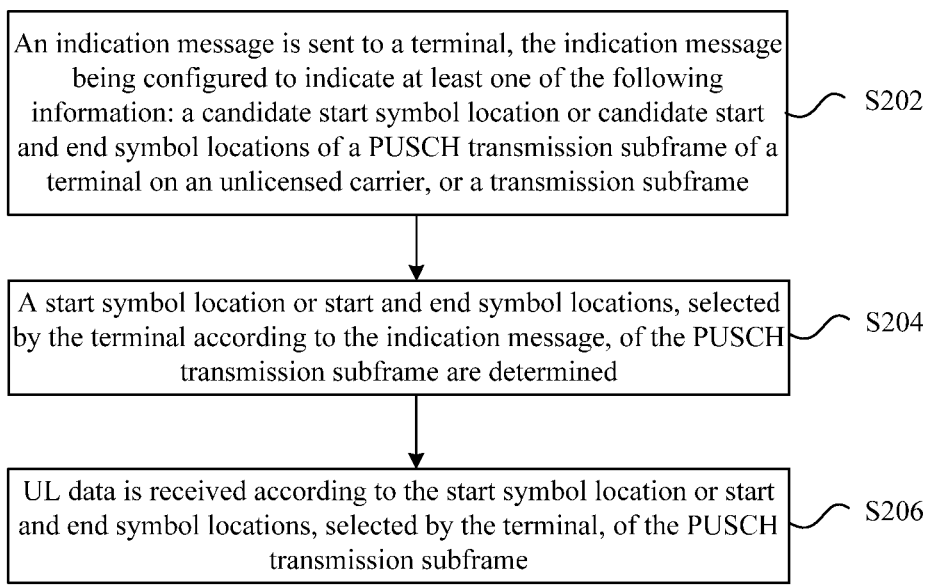
FIG. 2 is a flowchart of a method for receiving UL data according to an embodiment of the disclosure.

In an embodiment of the disclosure, there is further provided a method for receiving UL data. FIG. 2 is a flowchart of a method for receiving UL data according to an embodiment of the disclosure. As shown in FIG. 2, the method includes the following operations.

In S202, an indication message is sent to a terminal, the indication message being arranged to indicate at least one of the following information: a candidate start symbol location or candidate start and end symbol locations of a PUSCH transmission subframe of a terminal on an unlicensed carrier, or a transmission subframe.

In S204, a start symbol location or start and end symbol locations, selected by the terminal according to the indication message, of the PUSCH transmission subframe are determined.

In S206, UL data is received according to the start symbol location or start and end symbol locations, selected by the terminal, of the PUSCH transmission subframe.

The operations may be implemented by a base station. By the operations, the base station may notify the determined candidate start symbol location or candidate start and end symbol locations of the PUSCH transmission subframe on the unlicensed carrier to the terminal so as to enable the terminal to learn a moment when the UL data is transmitted on the unlicensed carrier. Therefore, the problem of incapability of the moment when the terminal transmits the UL data on the unlicensed carrier in the related art is solved, and a purpose of determining the moment when the terminal transmits the UL data on the unlicensed carrier and an effect of improving data transmission efficiency are further achieved.

In an optional embodiment, the start and end symbol locations of the PUSCH transmission subframe include at least one of the following. For a normal cyclic prefix format, the start symbol location of the PUSCH transmission subframe includes one of symbols {0}, {1}, {0, 7}, {1, 7}, {2, 7} or {0, 3, 7, 10} and the end symbol location of the PUSCH transmission subframe may include one of symbols {5}, {6}, {13}, {12} or {7, 13}. Or, for an extended cyclic prefix format, the start symbol location of the PUSCH transmission subframe may include one of symbols {0}, {1}, {0, 6}, {1, 6}, {2, 6} or {0, 2, 6, 8} and the end symbol location of the PUSCH transmission subframe includes one of symbols {4}, {5}, {11}, {10} or {5, 11}.

In an optional embodiment, the indication message may include at least one of scheduling indication information, signaling indication information, an RRC message and DCI.

In an optional embodiment, the operation that the start symbol location or start and end symbol locations, selected by the terminal according to the indication message, of the PUSCH transmission subframe are determined includes that: the start symbol location or start and end symbol locations, selected by the terminal, of the PUSCH transmission subframe is determined in at least one of the following manners: blind detection, determination through an occupancy signal or RS sent by the terminal, or determination through a DMRS sent by the terminal. A specific determination manner may be described in the following embodiments in detail.

Figure 3:
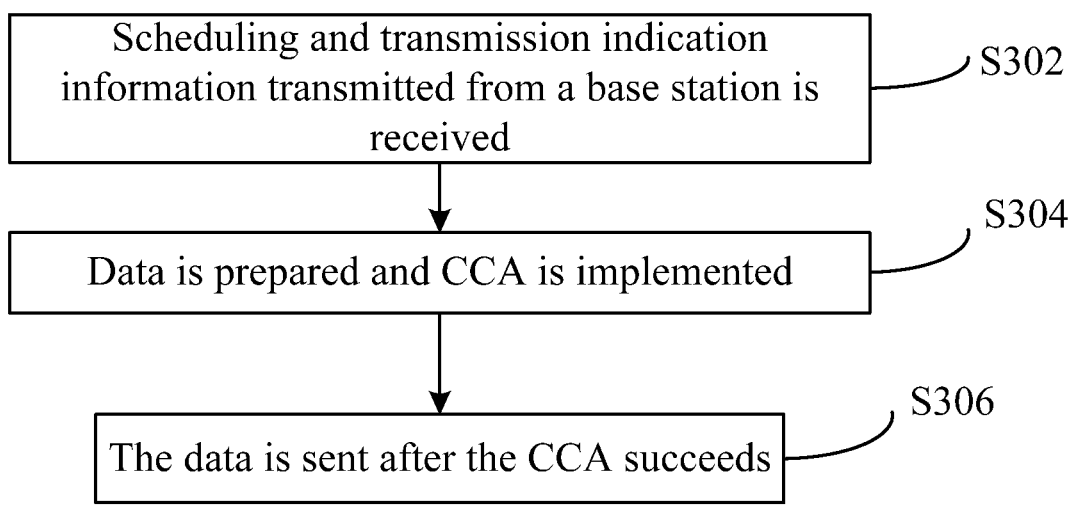
FIG. 3 is an overall flowchart of UL data transmission according to an embodiment of the disclosure.

In an embodiment of the disclosure, an UL data transmission method is further provided. FIG. 3 is an overall flowchart of UL data transmission according to an embodiment of the disclosure. As shown in FIG. 3, the method may be applied to a terminal and includes the following operations.

In S302, the terminal receives scheduling and transmission indication information (corresponding to the above-mentioned indication message) transmitted from a base station.

In S304, the terminal determines a TBS according to the received scheduling and transmission indication information, prepares UL data and implements CCA.

In S306, the terminal transmits the corresponding UL data from a data transmission starting point closest to a moment when CCA succeeds.

The embodiments of the disclosure will be described below in combination with related operations in the terminal and the base station in detail.

First Embodiment

Descriptions will be made in the embodiment with the condition that a PUSCH is started to be transmitted from a symbol 7 (that is, a start location of a PUSCH transmission subframe is the symbol 7) as an example.

When a base station configures through RRC signaling that a start symbol location for UL data transmission may be the symbol 7, a terminal is required to prepare multiple data copies because the terminal does not know a specific location where CCA succeeds before sending the PUSCH (namely performing PUSCH transmission). When candidate start symbols of the PUSCH transmission subframe (which may also be called a PUSCH for short) are symbols {0, 7} or {1, 7} or {2, 7}, the terminal is required to prepare two data copies corresponding to PUSCH transmission of which start symbols are the symbol 0/1/2 and the symbol 7 respectively. Meanwhile, the terminal determines whether the corresponding PUSCH is finally started to be transmitted from the symbol 0 or the symbol 7 according to a subframe location where CCA succeeds. When the candidate start symbols of the PUSCH are {0, 3, 7, 10}, the terminal is required to prepare four data copies.

Figure 4:
FIG. 4 is a structure diagram of an incomplete subframe in which a PUSCH is started to be transmitted from a symbol 7 according to an embodiment of the disclosure.

When the location where CCA succeeds is any moment between the symbol 0 and the symbol 7, the PUSCH is started to be transmitted from the symbol 7 of the subframe. A structure of an incomplete subframe for PUSCH transmission may be shown in FIG. 4. FIG. 4 is a structure diagram of an incomplete subframe when a PUSCH is started to be transmitted from a symbol 7 according to an embodiment of the disclosure.

Figure 5:
FIG. 5 is a first structure diagram of a subframe in which a PUSCH is started to be transmitted from a symbol 7 and which includes an SRS according to an embodiment of the disclosure.
Figure 6:
FIG. 6 is a second structure diagram of a subframe in which a PUSCH is started to be transmitted from a symbol 7 and which includes an SRS according to an embodiment of the disclosure.

The incomplete subframe only includes a DMRS, the DMRS is located at a middle location of a time slot and a root sequence is determined according to an odd time slot index when a sequence is generated. When the subframe is required to simultaneously transmit a periodic or aperiodic SRS, the SRS is located at a last symbol or second last symbol of the time slot or a first symbol of the time slot, as shown in FIG. 5 and FIG. 6 respectively. FIG. 5 is a first structure diagram of a subframe in which a PUSCH is started to be transmitted from a symbol 7 and which includes an SRS according to an embodiment of the disclosure. FIG. 6 is a second structure diagram of a subframe in which a PUSCH is started to be transmitted from a symbol 7 and which includes an SRS according to an embodiment of the disclosure.

In such a case, a corresponding TBS table in 36.213 is searched according to a half of the number of RBs allocated in an UL grant of the base station and a provided $I_{MCS}$ indication to determine a TBS for PUSCH transmission. For example, if the number of the RBs allocated in the UL grant is 8 and $I_{MCS}$ is 4, when the TBS is determined, the TBS table is searched according to $I_{TBS}$=4 and $n_{PRB}$=4 to obtain that the TBS for PUSCH transmission is 256.

When the subframe is a periodic or aperiodic SRS transmission subframe, data at a symbol location of the SRS is required to be punched away during PUSCH resource mapping, that is, the symbol 7 or a symbol 12 or a symbol 13 is punched.

Second Embodiment

Descriptions will be made in the embodiment with the condition that a PUSCH is started to be transmitted from a symbol 1 of a subframe as an example.

Figure 7:
FIG. 7 is a structure diagram of a subframe in which a PUSCH is started to be transmitted from a symbol 1 and which includes an SRS according to an embodiment of the disclosure.

In a case that a moment when a terminal ends CCA is between a symbol 0 and the symbol 1, the PUSCH may be started to be transmitted from the symbol 1. In such a case, sent data is modulated and coded data prepared according to a complete subframe, namely when transmission is started from the symbol 0. In such a case, a TBS for PUSCH transmission is determined according to a conventional art. It is only necessary to punch the symbol 0 away during resource mapping. A PUSCH transmission structure is shown in FIG. 7. FIG. 7 is a structure diagram of a subframe in which a PUSCH is started to be transmitted from a symbol 1 and which includes an SRS according to an embodiment of the disclosure. A DMRS location of the subframe is still an existing a symbol location. A sequence is also generated in an existing manner.

Similarly, if the subframe transmits an SRS, the SRS may be located on a last symbol of a first time slot or first symbol or last symbol or second last symbol of a second time slot in the structure of the PUSCH transmission subframe. Meanwhile, punching mapping is performed on corresponding PUSCH data.

Third Embodiment

Descriptions will be made in the embodiment with the condition that subframe transmission is started to be performed on a PUSCH from a symbol 2 as an example.

Figure 8:
FIG. 8 is a structure diagram of a subframe in which a PUSCH is started to be transmitted from a symbol 2 according to an embodiment of the disclosure.
Figure 9:
FIG. 9 is a structure diagram of a subframe in which a PUSCH is started to be transmitted from a symbol 2 and which includes an SRS according to an embodiment of the disclosure.

When a moment when a terminal ends CCA is between a symbol 1 and the symbol 2, in such a case, the PUSCH may be started to be transmitted from the symbol 1. In such a case, sent data is modulated and coded data prepared according to a complete subframe, namely when transmission is started from the symbol 0. Similarly, a punching manner is adopted during resource mapping and data corresponding to the symbol 0 and the symbol 1 is punched away. A PUSCH transmission structure is shown in FIG. 8 or FIG. 9. FIG. 8 is a structure diagram of a subframe in which a PUSCH is started to be transmitted from a symbol 2 according to an embodiment of the disclosure. FIG. 9 is a structure diagram of a subframe in which a PUSCH is started to be transmitted from a symbol 2 and which includes an SRS according to an embodiment of the disclosure.

In FIG. 8, a location of a DMRS is still an existing location in case of a complete subframe. In FIG. 9, a location of a DMRS in a first time slot is a modified symbol location and is a symbol 5. A root sequence index of the DMRS is determined according to an even time slot.

If the subframe transmits the SRS, the SRS may be located on a last symbol of the first time slot or first symbol or last symbol or second last symbol of a second time slot in the PUSCH transmission structure. Two manners may be adopted for data processing.

The first is to determine a TB S according to the complete subframe in the conventional art and punch data at the symbol location of the SRS away during resource mapping. The other is that the terminal determines the TBS according to an integral number of RBs obtained by rounding up or rounding down 7/12 of allocated PRBs and $I_{MCS}$ indicated in scheduling indication signaling.

For example, if the number of RBs allocated in an UL grant is 8 and $I_{MCS}$ is 4, when the TBS is determined, a TBS table is searched according to $I_{TBS}$=4 and $N_{PRB}$=ceil(8*7/12)=5 to obtain that the TBS for PUSCH transmission is 328 bits.

Fourth Embodiment

Descriptions will be made in the embodiment with the condition that subframe transmission is started to be performed on a PUSCH from a symbol 3 as an example.

Figure 10:
FIG. 10 is a structure diagram of a subframe in which a PUSCH is started to be transmitted from a symbol 3 according to an embodiment of the disclosure.
Figure 11:
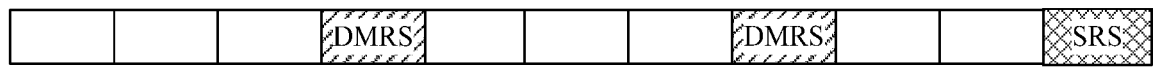
FIG. 11 is a structure diagram of a subframe in which a PUSCH is started to be transmitted from a symbol 3 and which includes an SRS according to an embodiment of the disclosure.

When a system predefinition or a configuration of a base station indicates that the PUSCH may be started to be transmitted from the symbol 3 and a moment when CCA succeeds is located between a symbol 0 and the symbol 3, a PUSCH transmission structure may be shown in FIG. 10 or FIG. 11. FIG. 10 is a structure diagram of a subframe in which a PUSCH is started to be transmitted from a symbol 3 according to an embodiment of the disclosure. FIG. 11 is a structure diagram of a subframe in which a PUSCH is started to be transmitted from a symbol 3 and which includes an SRS according to an embodiment of the disclosure.

In FIG. 10, a location of a DMRS is still a location of an existing complete subframe. In FIG. 11, a location of a DMRS in a first time slot is a modified symbol location and is a symbol 6 and a root sequence index of the DMRS is determined according to an even time slot.

When being determined, a TB S is determined according to an integral number of RBs obtained by rounding up or rounding down 7/12 of allocated PRBs and $I_{MCS}$ indicated in scheduling indication signaling.

For example, if the number of RBs in an UL grant is 36 and $I_{MCS}$ is 6, when the TBS is determined, a TBS table is searched according to $I_{TBS}$=6 and $N_{PRB}$=floor (36*7/12)=21 to obtain that the TBS for PUSCH transmission is 2,216 bits.

Or, a 7/12 operation is implemented on a TBS=3,752 determined according to the number 36 of the allocated RBs and $I_{TBS}$=6 at first to obtain a temporary TBS=2,188, and then a TBS=2,216 closest to the temporary BTS=2,188 is found from the TBS table as a final TBS for PUSCH transmission.

If the subframe transmits an SRS, the SRS may be located on a last symbol of a first time slot or first symbol or last symbol or second last symbol of a second time slot in the structure of the PUSCH transmission subframe. Meanwhile, data at the corresponding location is punched away during resource mapping.

Fifth Embodiment

Descriptions will be made to the condition that a terminal sends an occupancy signal when a location where CCA succeeds does not reach a candidate starting transmission symbol location for a PUSCH in the embodiment.

When there is a period of time from the moment when the terminal successfully implements CCA to a closest candidate data transmission starting moment, the terminal sends some signals at a resource location where scheduling allocation is located or on the full bandwidth. The signals include a preamble sequence, or a DMRS or an SRS.

Specifically, when left time is shorter than a symbol, the terminal may send a preamble. When the left time is longer than a symbol, the SRS or the DMRS may be sent a time-domain symbol repetition sending manner and a repetition frequency is the number of symbols between an ending moment of CCA and a starting transmission symbol for the PUSCH. Or, when the left time is longer than or equal to two symbols, the terminal may send a short Physical Random Access Channel (PRACH).

The signals are arranged to occupy the channel to prevent the carrier from being preempted by another node and, when being longer than or equal to a symbol, may further be arranged to assist a receiver in demodulating the PUSCH or performing channel measurement and/or notify a base station or other User Equipment (UE) that the channel has been occupied by the terminal of the local cell.

Sixth Embodiment

Descriptions will be made to a location of an incomplete subframe for resource mapping when UCI and scheduling data are multiplexed on a PUSCH for transmission in the embodiment.

When an UL subframe is an incomplete subframe, that is, transmission is not started from a symbol 0, the UCI includes an ACK/NACK and periodic or aperiodic Channel State Information (CSI) feedback information, for example, a PMP and an RI. Mapped locations during multiplexing of CQI information and scheduled service data on the same subframe are as follows.

When the PUSCH transmits the ACK/NACK, ACK/NACK information is mapped to symbol locations on a left side or right side or both left and right sides adjacent to a DMRS symbol. For example, when a DMRS is located at a symbol 5, the ACK/NACK information may be mapped to locations of a symbol 4 and/or a symbol 6. When the DMRS is located at the symbol 6, the ACK/NACK information may be mapped to the symbol 5 and/or a symbol 7. The mapped locations for the ACK/NACK in a second time slot are mapped according to existing symbol locations.

When the PUSCH transmits the RI, mapped locations in the second time slot are mapped according to existing mapped symbol locations and mapped locations in a first time slot are symbol locations spaced by a symbol respectively on the two sides of the symbol where the DMRS is located. For example, when the DMRS is located at the symbol 5, the RI is located at a symbol 3 and the symbol 7. When the DMRS is located at the symbol 6, the RI may be located at the symbol 4 and the symbol 8.

When a PUSCH subframe includes a CQI/PMI, resource mapping for the CQI/PMI is started from a symbol and frequency-domain location with a smallest PUSCH resource, CQI/PMI information is mapped at first and then the scheduled data is mapped by left PUSCH resources.

Meanwhile, when the scheduled service data is mapped, the resource locations to which the UCI is mapped are required to be punched.

Figure 12:
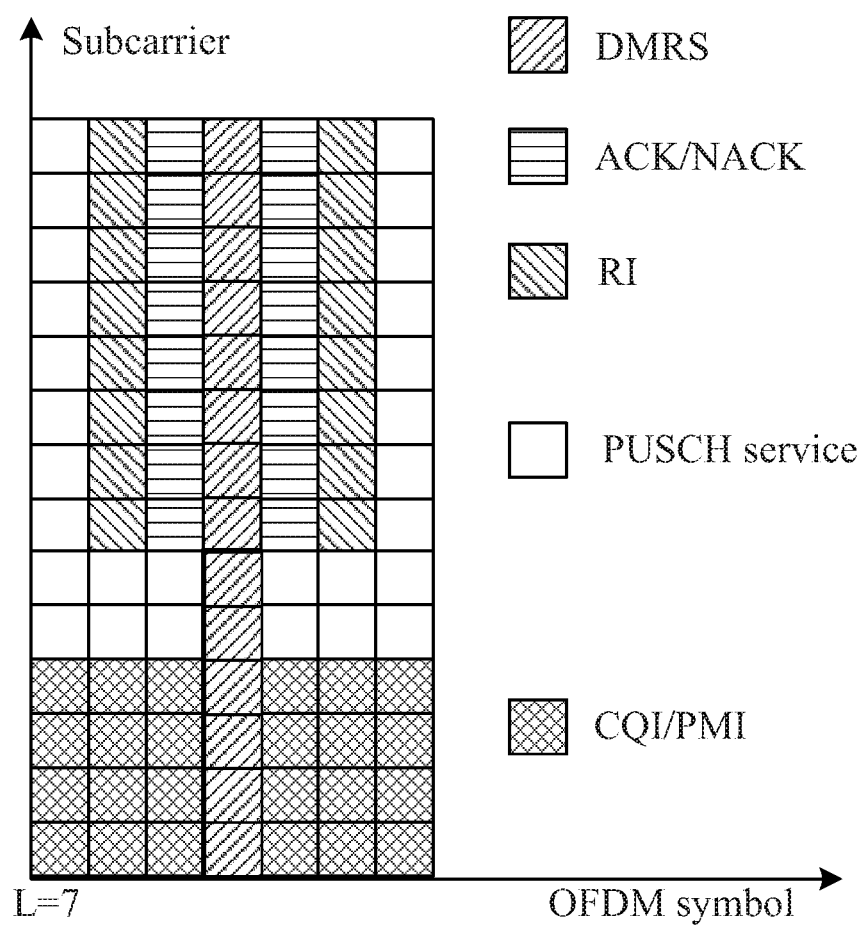
FIG. 12 is a structure diagram of a subframe in which a PUSCH is started to be transmitted from a symbol 7 when UCI is transmitted in the subframe according to an embodiment of the disclosure.

The corresponding resource locations where the UCI and the data are multiplexed when the PUSCH is started to be transmitted from the symbol 7 may be shown in FIG. 12. FIG. 12 is a structure diagram of a subframe in which a PUSCH is started to be transmitted from a symbol 7 when UCI is transmitted in the subframe according to an embodiment of the disclosure. A difference with a complete subframe is that a Resource Element (RE) mapping index of the UCI is started from not the first time slot but the second time slot. That is, the ACK/NACK is started to be mapped from a symbol 9 and may be mapped to part of RBs of the PUSCH of the symbol 9 and a symbol 11. RI information is started to be mapped from a symbol 8 and may be mapped to part of RBs of the PUSCH of a symbol 8 and a symbol 12. The CQI/PMI is started to be mapped from a location of a first allocated RB of the PUSCH on the symbol 7.

Figure 13:
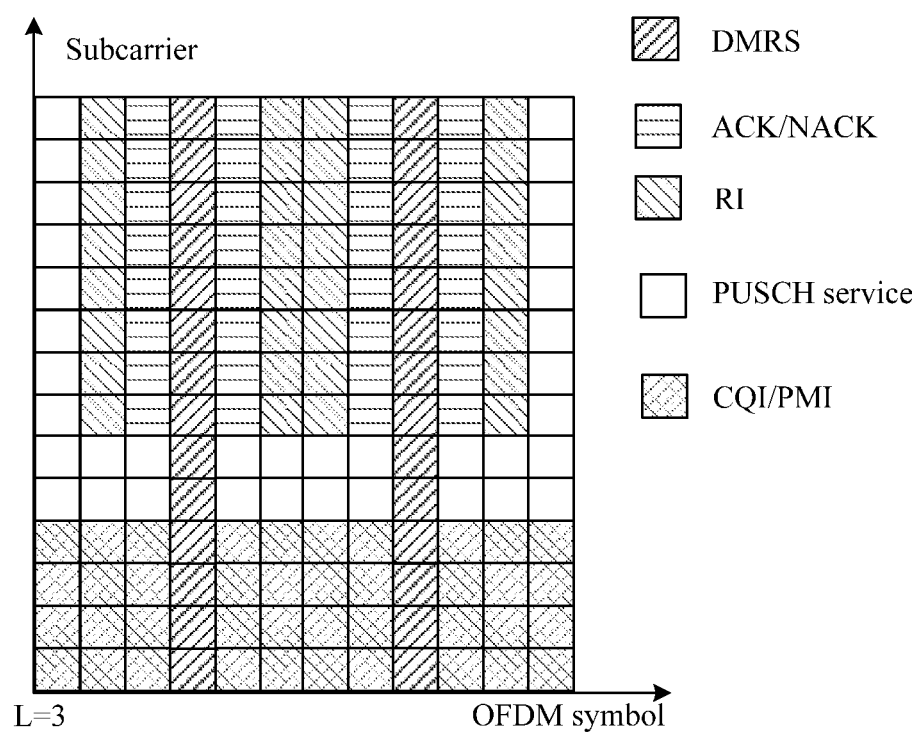
FIG. 13 is a structure diagram of a subframe in which a PUSCH is started to be transmitted from a symbol 3 when UCI is transmitted in the subframe according to an embodiment of the disclosure.

The corresponding resource locations where the UCI and the data are multiplexed when the PUSCH is started to be transmitted from the symbol 3 may be shown in FIG. 13. FIG. 13 is a structure diagram of a subframe in which a PUSCH is started to be transmitted from a symbol 3 when UCI is transmitted in the subframe according to an embodiment of the disclosure. The DMRS is located at symbols 6 and 10. The ACK/NACK is started to be mapped from the symbol 4 and may be mapped onto part of RBs of the PUSCH of the symbol 4 and the symbol 6 and part of RBs of the PUSCH of the symbol 9 and symbol 11 of the second time slot. The RI information is started to be mapped from the symbol 3 and may be mapped to the symbol 3, the symbol 7 and part of RBs of the PUSCH of the symbol 8 and the symbol 12. The CQI/PMI is started to be mapped from the location of the first allocated RB of the PUSCH on the symbol 3.

The scheduled UL service data corresponds to a TBS determined according to that transmission is started from the symbol 3. During resource mapping, an RB/RE occupied by control information is required to be punched.

Seventh Embodiment

Descriptions will be made to reception and demodulation of UL data by a base station in the embodiment.

After completely sending UL scheduling information, the base station receives scheduling data according to a timing relationship or a predetermined subframe location. A receiving and demodulation method includes at least one of the following methods.

A first method: a blind detection manner.

The base station, after receiving data of the whole subframe, demodulates it according to a Modulation and Coding Scheme (MCS)/TBS of a complete subframe and, if failing, decodes each possible candidate subframe structure of an incomplete subframe.

For example, when there are two possible PUSCH subframe structures in which a candidate start symbol location for PUSCH transmission is a symbol 0 and a symbol 7, the base station, after receiving the data of the corresponding subframe, demodulates it according to the MCS of the complete subframe and, if failing, demodulates it according to a TBS or MCS corresponding to a half subframe.

A second method: determination according to an occupancy signal.

If a location preempted successfully by UE is not a boundary of the candidate transmission start symbol, the UE may send the occupancy signal, the occupancy signal containing a local cell identifier. The base station determines an MCS or TBS adopted for transmission of the UE by performing blind detection on the occupancy signal and a time-domain location of the detected occupancy signal.

A third method: the base station implicitly determines a frame structure and the MCS through a sequence structure of a DMRS.

If a PUSCH is started to be transmitted from a first time slot, a first sequence of the DMRS, i.e., a DMRS sequence included in the first time slot, is different from a root sequence of a DMRS sequence of the incomplete subframe when transmission is started from a second time slot. The base station determines the frame structure and the MCS or the TBS through the detected first DMRS sequence.

Then, the base station demodulates the received data according to a determined starting location of the PUSCH and the corresponding TBS/MCS.

According to a transmission method provided in the embodiments of the disclosure for an UL subframe of an unlicensed spectrum, a problem about determination of a starting point for UL data transmission on an unlicensed carrier in LTE is solved and a resource utilization rate is increased. Meanwhile, a solution is provided for resource mapping during multiplexing of service data and an SRS or UCI on the same subframe for transmission.

From the above descriptions about the implementation modes, those skilled in the art may clearly know that the method according to the abovementioned embodiments may be implemented in a manner of combining software and a necessary universal hardware platform, and of course, may also be implemented through hardware. However, the former is a preferred implementation mode under many circumstances. Based on such an understanding, the technical solutions of the disclosure substantially or parts making contributions to the conventional art may be embodied in form of software product, and the computer software product is stored in a storage medium (for example, a Read-Only Memory (ROM)/Random Access Memory (RAM), a magnetic disk and an optical disk), including a plurality of instructions arranged to enable a computer device (which may be a personal computer, a server, a network device or the like) to implement the method in each embodiment of the disclosure.

The embodiments further provide a device for sending UL data and a device for receiving UL data. The devices are arranged to implement the abovementioned embodiments and preferred implementation modes. What has been described will not be elaborated. For example, term "module", used below, may be a combination of software and/or hardware capable of realizing a preset function. Although the devices described in the following embodiments are preferably implemented with software, implementation with hardware or a combination of the software and the hardware is also possible and conceivable.

Figure 14:
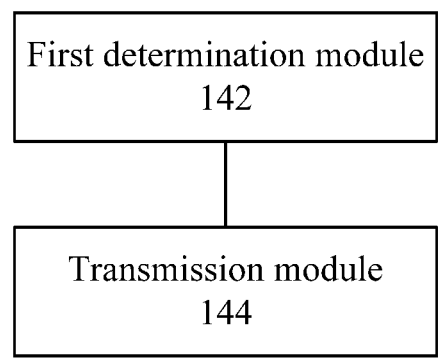
FIG. 14 is a structure block diagram of device for sending UL data according to an embodiment of the disclosure.

FIG. 14 is a structure block diagram of a device for sending UL data according to an embodiment of the disclosure. As shown in FIG. 14, the device includes a first determination module 142 and a transmission module 144. The device will be described below.

The first determination module 142 is arranged to determine a start symbol location or start and end symbol locations of a PUSCH transmission subframe on an unlicensed carrier are determined through a predefinition or according to an indication message received from a base station. The transmission module 144 is connected to the first determination module 142 and is arranged to send UL data according to the determined start symbol location or start and end symbol locations.

In an optional embodiment, the start and end symbol locations of the PUSCH transmission subframe include at least one of the following. For a normal cyclic prefix format, the start symbol location of the PUSCH transmission subframe includes one of symbols {0}, {1}, {0, 7}, {1, 7}, {2, 7} or {0, 3, 7, 10} and the end symbol location of the PUSCH transmission subframe includes one of symbols {5}, {6}, {13}, {12} or {7, 13}. Or, for an extended cyclic prefix format, the start symbol location of the PUSCH transmission subframe includes one of symbols {0}, {1}, {0, 6}, {1, 6}, {2, 6} or {0, 2, 6, 8} and the end symbol location of the PUSCH transmission subframe includes one of symbols {4}, {5}, {11}, {10} or {5, 11}. It is to be noted that the start symbol locations and end symbol locations, listed above, of the PUSCH transmission subframe are only some examples and other symbol locations may also be used as the start symbol location and/or end symbol location of the PUSCH transmission subframe. Examples will not be listed one by one herein.

In an optional embodiment, the indication message may include at least one of scheduling indication information, signaling indication information, an RRC message and DCI. The indication message may contain the start symbol location or start and end symbol locations of the PUSCH transmission subframe. Optionally, when being born through the DCI, the start symbol location or the start symbol location and the end symbol location may be born through an UL index or DAI domain in an existing DCI format 0 or 4 or born through dedicated signaling in format 1C. Preferably, the scheduling indication information may at least include frequency-domain location indication information and modulation and coding information $I_{MCS}$ for PUSCH transmission.

From the abovementioned embodiments, it can be seen that a terminal may determine the location of the PUSCH transmission subframe through the predefinition or the indication message received from the base station. In an optional embodiment, the terminal may preferably determine the location of the PUSCH transmission subframe according to the indication message from the base station and, when the terminal does not receive the indication message of the base station, may determine the start and end symbol locations of the PUSCH transmission subframe according to the system predefinition.

In an optional embodiment, the PUSCH transmission subframe is located on a transmission subframe indicated by the scheduling indication information or signaling indication information comprised in the indication message from the base station, and/or the PUSCH transmission subframe is located on n subfames before or after a transmission subframe indicated by the scheduling indication information or signaling indication information comprised in the indication message, where 1≤n<4.

Figure 15:
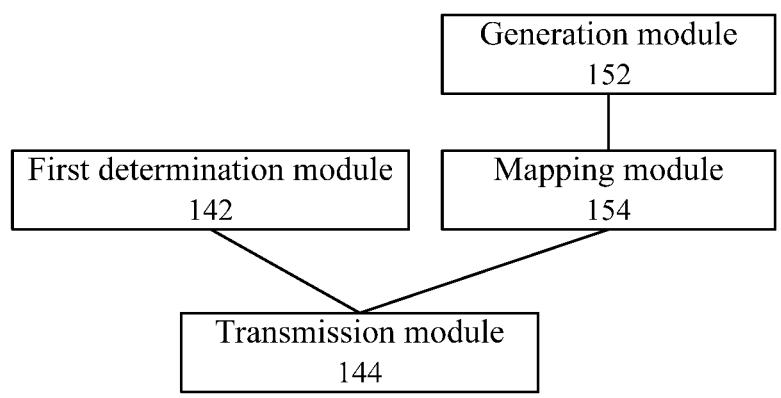
FIG. 15 is a first preferred structure block diagram of a device for sending UL data according to an embodiment of the disclosure.

FIG. 15 is a first preferred structure block diagram of a device for sending UL data according to an embodiment of the disclosure. As shown in FIG. 15, the device further includes a generation module 152 and a mapping module 154, besides all the modules shown in FIG. 14. The device will be described below.

The generation module 152 is arranged to, before the UL data is sent according to the determined start symbol location or start and end symbol locations, generate a DMRS. The mapping module 154 is connected to the generation module 152 and the transmission module 144 and is arranged to map the generated DMRS onto a symbol corresponding to the PUSCH transmission subframe corresponding to the start symbol location. When the start symbol location of the PUSCH transmission subframe is the symbol 7, a symbol location to which the DMRS is mapped is the symbol 10. When the start symbol location of the PUSCH transmission subframe is the symbol 3, the symbol location to which the DMRS is mapped is the symbol 3 and the symbol 10 or the symbol location to which the DMRS is mapped is the symbol 6 and the symbol 10. When the start symbol location of the PUSCH transmission subframe is the symbol 1, the symbol location to which the DMRS is mapped is the symbol 3 and the symbol 10. When the start symbol location of the PUSCH transmission subframe is the symbol 2, the symbol location to which the DMRS is mapped is the symbol 3 and the symbol 10 or the symbol 5 and the symbol 10.

In an optional embodiment, when the symbol location to which the DMRS is mapped is the symbol 5 or the symbol 6, a root sequence index of the DMRS is determined according to an even time slot, and a value of a sequence cyclic shift $n_{PRS}$ of the DMRS is determined according to the even time slot.

In an optional embodiment, the first determination module 142 may include a first determination unit and a selection unit. The first determination module 142 will be described below.

The first determination unit is arranged to determine a candidate start symbol location or candidate start and end symbol locations of the PUSCH transmission subframe on the unlicensed carrier are determined through the predefinition or according to the indication message received from the base station. The selection unit is connected to the first determination unit and is arranged to select the start symbol location or start and end symbol locations of the PUSCH transmission subframe from among the candidate start symbol location or candidate start and end symbol locations of the PUSCH transmission subframe according to a moment when CCA is successfully implemented.

Figure 16:
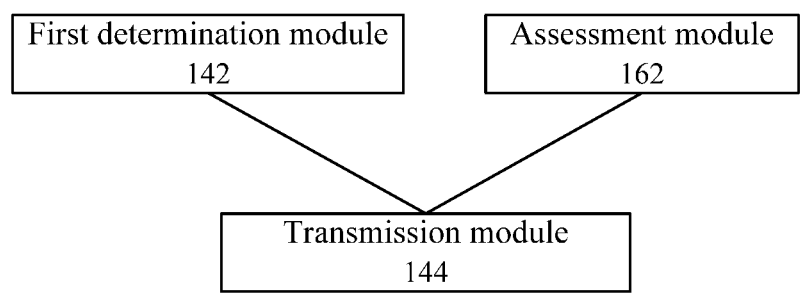
FIG. 16 is a second preferred structure block diagram of a device for sending UL data according to an embodiment of the disclosure.

FIG. 16 is a second preferred structure block diagram of a device for sending UL data according to an embodiment of the disclosure. As shown in FIG. 16, the device further includes an assessment module 162, besides all the modules shown in FIG. 14. The device will be described below.

The assessment module 162 is connected to the transmission module 144 and is arranged to, before the start symbol location or start and end symbol locations of the PUSCH transmission subframe are selected from among the candidate start symbol location or candidate start and end symbol locations of the PUSCH transmission subframe according to the moment when CCA is successfully implemented, implement CCA in the following manners. CCA is implemented at any moment of first m subframes of transmission subframes indicated by the scheduling indication information comprised in the indication message from the base station, where 1≤m<4. Or, CCA is started to be implemented from a starting boundary of the transmission subframe indicated by the scheduling indication information comprised in the indication message from the base station. Optionally, the moment when CCA is implemented may further include at least one of the following: CCA is started to be implemented from any moment after an UL grant is received, or CCA is started to be implemented from any moment after a previous subframe of a scheduling subframe where PUSCH transmission is located, or CCA is started to be implemented from a last one or last two symbols of the previous subframe of the scheduling subframe or CCA is started to be implemented from a start symbol of the scheduling subframe where the PUSCH is located. It is to be noted that the moments, listed herein, when CCA is implemented are only two examples and specific time when CCA is implemented may also be determined according to a practical requirement.

In an optional embodiment, the selection unit may include a selection subunit. The selection subunit is arranged to determine a candidate start symbol location closest to the moment when CCA is successfully implemented as a final start symbol location of the PUSCH transmission subframe, or determine the candidate start symbol location closest to the moment when CCA is successfully implemented as the final start symbol location of the PUSCH transmission subframe and determine a final end symbol location according to the final start symbol location.

In an optional embodiment, the device for sending UL data further includes a processing module. The processing module is connected to the assessment module 162 and is arranged to, after CCA is implemented, when the moment when CCA is successfully implemented does not reach the closest candidate start symbol location, send an occupancy signal or an RS. The RS includes at least one of a preamble, a DMRS or an SRS. The occupancy signal or the RS is used by the base station to perform at least one of demodulating a PUSCH or notifying the base station or another terminal that the channel has been occupied.

In an optional embodiment, the transmission module 144 may send the UL data according to the determined start symbol location or start and end symbol locations in the following manners: determining a number of symbols, arranged for data transmission, of the PUSCH transmission subframe and sending the UL data according to the determined number of symbols. Optionally, when there is more than one candidate start symbol location of the PUSCH transmission subframe, the terminal is required to prepare PUSCH coding and modulation data copies in a number the same as the number of the start symbol locations.

In an optional embodiment, an UL data TBS of an incomplete subframe corresponding to a start symbol is determined through at least one of the following ways. A first way: PRBs and modulation and coding information parameter $I_{MCS}$ both corresponding to the incomplete subframe corresponding to the start symbol are determined according to the scheduling indication information comprised in the indication message received from the base station and the TBS corresponding to the incomplete subframe corresponding to the start symbol is determined according to the determined PRBs and parameter $I_{MCS}$. A second way: PRBs and modulation and coding information parameter $I_{MCS}$ corresponding to a complete subframe are determined according to the scheduling indication information comprised in the indication message received from the base station and the TBS corresponding to the incomplete subframe is determined according to the determined PRBs, conversion rule and parameter $I_{MCS}$ corresponding to the complete subframe. In the first method, the scheduling indication information indicates PRBs and $I_{MCS}$ corresponding to all the candidate start symbol locations of the PUSCH transmission subframe and the terminal may determine a TBS corresponding to each start symbol location of the PUSCH transmission subframe according to the information provided by the base station. In the second method, the scheduling indication information only indicates $I_{MCS}$ and PRBs corresponding to the complete subframe but a start symbol of the PUSCH transmission subframe may not be a complete subframe, and then the TBS corresponding to the start symbol may be determined according to the conversion rule when being determined.

In an optional embodiment, the conversion rule may include at least one of the following rules. When the start symbol location of the PUSCH transmission subframe is the symbol 7, the TBS corresponding to the incomplete subframe is determined according to the number of the PRBs that is a half of the number of PRBs indicated in the scheduling indication signaling and according to $I_{MCS}$ indicated by the scheduling indication signaling. When the start symbol location of the PUSCH transmission subframe is the symbol 3, the TBS corresponding to the incomplete subframe is determined according to an integral number of PRBs obtained by rounding up or rounding down 7/12 of the PRBs indicated in the scheduling indication signaling and $I_{MCS}$ indicated in the scheduling indication signaling. When the start symbol location of the PUSCH transmission subframe is the symbol 1 or the symbol 2, the TBS corresponding to the incomplete subframe is determined according to the number of the PRBs indicated in the scheduling indication signaling and $I_{MCS}$ indicated in the scheduling indication signaling. A TBS determined according to m/12 of the PRBs indicated in the scheduling indication signaling and $I_{MCS}$ indicated in the scheduling indication signaling is determined as a temporary TBS and then a TBS closest to the temporary TBS is found from a TBS table as the TBS corresponding to the incomplete subframe, m being a number of symbols, arranged for data transmission, in the incomplete subframe. Optionally, when the start symbol location of the PUSCH transmission subframe is the symbol 0, the TBS may be determined according to a solution in the related art.

In an optional embodiment, when the PUSCH transmission subframe is a periodic or aperiodic SRS transmission subframe, the SRS is located on a last symbol of a first time slot of the PUSCH, or a first symbol or last symbol or second last symbol of a second time slot of the PUSCH.

In an optional embodiment, the UL data may include UCI and/or service data. Optionally, when the UCI and the service data are multiplexed on the same subframe for transmission, resource mapping includes at least one of the following. When the start symbol location of the PUSCH transmission subframe is the symbol 7, the calculation of a PRB resource mapping index of the UCI starts from the second time slot. When the start symbol location of the PUSCH transmission subframe is the symbol 3, at least one of an ACK or NACK of the UCI starts to be mapped from the symbol 4 and is mapped onto part of RBs of the PUSCH of the symbol 4 and the symbol 6 and part of RBs of the PUSCH of the symbol 9 and symbol 11 of the second time slot. An RI in the UCI starts to be mapped from the symbol 3 and is mapped onto the symbol 3, the symbol 7 and part of PRBs of the PUSCH in the symbol 8 and the symbol 12. At least one of a CQI or PMI in the UCI starts to be mapped from a location of a first PRB of PRBs on the symbol {3}, which are indicated by the scheduling indication information from the base station. That is, when the PUSCH transmits the UCI, ACK and/or NACK information is mapped to adjacent symbol locations on two sides of a symbol for the DMRS, the RI is mapped to symbol locations spaced by a symbol respectively on the two sides of the symbol where the DMRS is located, and the CQI and the PMI are started to be mapped from the first RB allocated by the first symbol where PUSCH transmission is started.

In an optional embodiment, when at least one of the SRS or the UCI is transmitted on the incomplete subframe in the PUSCH transmission subframe, a resource location corresponding to at least one of the SRS or the UCI is punched during service data resource mapping.

Figure 17:
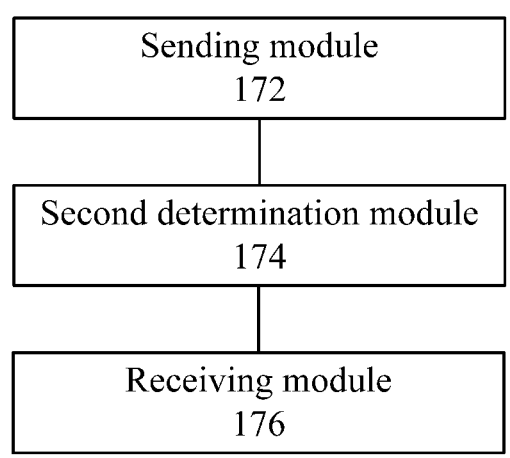
FIG. 17 is a structure block diagram of a device for receiving UL data according to an embodiment of the disclosure.

FIG. 17 is a structure block diagram of a device for receiving UL data according to an embodiment of the disclosure. As shown in FIG. 17, the device includes a sending module 172, a second determination module 174 and a receiving module 176. The device will be described below.

The sending module 172 is arranged to send an indication message to a terminal, the indication message being arranged to indicate at least one of the following information: a candidate start symbol location or candidate start and end symbol locations of a PUSCH transmission subframe of a terminal on an unlicensed carrier, or a transmission subframe. The second determination module 174 is connected to the sending module 172 and is arranged to determine a start symbol location or start and end symbol locations, selected by the terminal according to the indication message, of the PUSCH transmission subframe. The receiving module 176 is connected to the second determination module 174 and is arranged to receive UL data according to the start symbol location or start and end symbol locations, selected by the terminal, of the PUSCH transmission subframe.

In an optional embodiment, the start and end symbol locations of the PUSCH transmission subframe include at least one of the following. For a normal cyclic prefix format, the start symbol location of the PUSCH transmission subframe includes one of symbols {0}, {1}, {0, 7}, {1, 7}, {2, 7} or {0, 3, 7, 10} and the end symbol location of the PUSCH transmission subframe may include one of symbols {5}, {6}, {13}, {12} or {7, 13}. Or, for an extended cyclic prefix format, the start symbol location of the PUSCH transmission subframe may include one of symbols {0}, {1}, 10, 61, 11, 61, {2, 6} or 10, 2, 6, 81 and the end symbol location of the PUSCH transmission subframe includes one of symbols {4}, {5}, {11}, {10} or {5, 11}.

In an optional embodiment, the indication message may include at least one of scheduling indication information, signaling indication information, an RRC message and DCI.

In an optional embodiment, the second determination module 174 includes a second determination unit. The second determination unit is arranged to determine the start symbol location or start and end symbol locations, selected by the terminal, of the PUSCH transmission subframe in at least one of the following manners: blind detection, determination through an occupancy signal or RS sent by the terminal, or determination through a DMRS sent by the terminal. A specific determination manner may be described in the following embodiments in detail.

Figure 18:
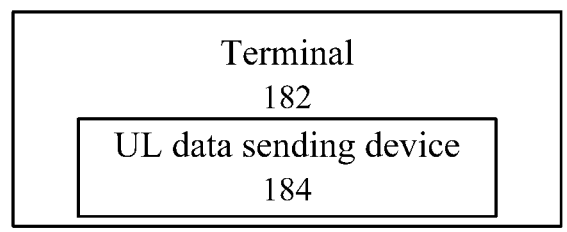
FIG. 18 is a structure block diagram of a terminal according to an embodiment of the disclosure.

FIG. 18 is a structure block diagram of a terminal according to an embodiment of the disclosure. As shown in FIG. 18, the terminal 182 includes any abovementioned device 184 for sending UL data.

Figure 19:
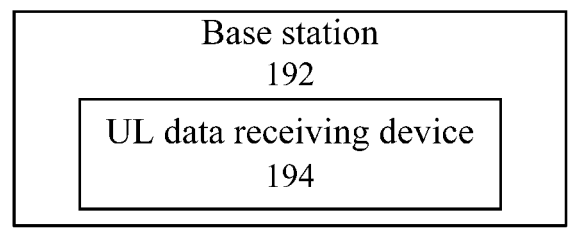
FIG. 19 is a structure block diagram of a base station according to an embodiment of the disclosure.

FIG. 19 is a structure block diagram of a base station according to an embodiment of the disclosure. As shown in FIG. 19, the base station 192 includes any abovementioned device 194 for receiving UL data.

It is to be noted that each module may be implemented through software or hardware. The latter condition may be implemented in, but not limited to, the following manners: all of the modules are located in the same processor or the modules are located in multiple processors respectively.

An embodiment of the disclosure further provides a storage medium. Optionally, in the embodiment, the storage medium may be arranged to store a program code arranged to implement the following operations.

In S11, a start symbol location or start and end symbol locations of a PUSCH transmission subframe on an unlicensed carrier are determined through a predefinition or according to an indication message received from a base station.

In S12, UL data is sent according to the determined start symbol location or start and end symbol locations.

Optionally, in the embodiment, the storage medium may further be arranged to store a program code arranged to implement the following operations.

In S21, an indication message is sent to a terminal, the indication message being arranged to indicate at least one of the following information: a candidate start symbol location or candidate start and end symbol locations of a PUSCH transmission subframe of a terminal on an unlicensed carrier, or a transmission subframe.

In S22, a start symbol location or start and end symbol locations, selected by the terminal according to the indication message, of the PUSCH transmission subframe are determined In S23, UL data is received according to the start symbol location or start and end symbol locations, selected by the terminal, of the PUSCH transmission subframe.

Optionally, in the embodiment, the storage medium may include, but not limited to various media capable of storing a program code such as a U disk, a ROM, a RAM, a mobile hard disk, a magnetic disk or an optical disk.

Optionally, in the embodiment, a processor implements the operations in each method embodiment according to the program code stored in the storage medium.

Optionally, specific examples in the embodiment may refer to the examples described in the abovementioned embodiments and optional implementation modes and will not be elaborated in the embodiment.

Obviously, those skilled in the art should know that each module or each operation of the disclosure may be implemented by a universal computing device, and the modules or operations may be concentrated on a single computing device or distributed on a network formed by a plurality of computing devices, and may optionally be implemented by program codes executable for the computing devices, so that the modules or operations may be stored in a storage device for execution with the computing devices, the shown or described operations may be implemented in sequences different from those described here in some circumstances, or may form each integrated circuit module respectively, or multiple modules or operations therein may form a single integrated circuit module for implementation. As a consequence, the disclosure is not limited to any specific hardware and software combination.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

As described above, the methods and devices for sending and receiving UL data, terminal and base station provided in the embodiments of the disclosure have the following beneficial effects: the problem of incapability of determining a moment when a terminal transmits UL data on an unlicensed carrier in the related art is solved, and a purpose of determining the moment when the terminal transmits the UL data on the unlicensed carrier and an effect of improving data transmission efficiency are further achieved.

The invention claimed is:

1. A method for sending Uplink (UL) data, comprising:
determining a start symbol location or start and end symbol locations of a Physical Uplink Shared Channel (PUSCH) transmission subframe on an unlicensed carrier through a predefinition or according to an indication message received from a base station; and
sending the UL data according to the determined start symbol location or start and end symbol locations;
wherein before sending the UL data according to the determined start symbol location or start and end symbol locations, the method further comprises:
generating a DeModulation Reference Signal (DMRS); and
mapping the generated DMRS onto a symbol corresponding to the PUSCH transmission subframe corresponding to the start symbol location;
wherein when the start symbol location of the PUSCH transmission subframe is the symbol 7, a symbol location to which the DMRS is mapped is the symbol 10; when the start symbol location of the PUSCH transmission subframe is the symbol 3, the symbol location to which the DMRS is mapped is the symbol 3 and the symbol 10 or the symbol location to which the DMRS is mapped is the symbol 6 and the symbol 10; when the start symbol location of the PUSCH transmission subframe is the symbol 1, the symbol location to which the DMRS is mapped is the symbol 3 and the symbol 10; and when the start symbol location of the PUSCH transmission subframe is the symbol 2, the symbol location to which the DMRS is mapped is the symbol 3 and the symbol 10 or the symbol 5 and the symbol 10.

2. The method of claim 1, wherein the start and end symbol locations of the PUSCH transmission subframe comprise at least one of the following:
for a normal cyclic prefix format, the start symbol location of the PUSCH transmission subframe comprises one of symbols {0}, {1}, {0, 7}, {1, 7}, {2, 7} or {0, 3, 7, 10} and the end symbol location of the PUSCH transmission subframe comprises one of symbols {5}, {6}, {13}, {12} or {7, 13}; or,
for an extended cyclic prefix format, the start symbol location of the PUSCH transmission subframe comprises one of symbols {0}, {1}, {0, 6}, {1, 6}, {2, 6} or {0, 2, 6, 8} and the end symbol location of the PUSCH transmission subframe comprises one of symbols {4}, {5}, {11}, {10} or {5, 11}.

3. The method of claim 1, comprising at least one of the followings:

the indication message comprises at least one of scheduling indication information, signaling indication information, a Radio Resource Control (RRC) message or Downlink Control Information (DCI); or the PUSCH transmission subframe is located on a transmission subframe indicated by the scheduling indication information or signaling indication information comprised in the indication message from the base station, and/or the PUSCH transmission subframe is located on n subfames before or after a transmission subframe indicated by the scheduling indication information or signaling indication information comprised in the indication message, wherein 1≤n<4.

4. The method of claim 1, wherein when the symbol location to which the DMRS is mapped is the symbol 5 or the symbol 6, a root sequence index of the DMRS is determined according to an even time slot, and a value of a sequence cyclic shift $n_{PRS}$ of the DMRS is determined according to the even time slot.

5. The method of claim 1, wherein determining the start symbol location or start and end symbol locations of the PUSCH transmission subframe on the unlicensed carrier through the predefinition or according to the indication message received from the base station comprises:

determining a candidate start symbol location or candidate start and end symbol locations of the PUSCH transmission subframe on the unlicensed carrier through the predefinition or according to the indication message received from the base station; and selecting the start symbol location or start and end symbol locations of the PUSCH transmission subframe from among the candidate start symbol location or candidate start and end symbol locations of the PUSCH transmission subframe according to a moment when Clear Channel Assessment (CCA) is successfully implemented.

6. The method of claim 5, wherein before selecting the start symbol location or start and end symbol locations of the PUSCH transmission subframe from among the candidate start symbol location or candidate start and end symbol locations of the PUSCH transmission subframe according to the moment when CCA is successfully implemented, further comprising implementing CCA in the following manners: implementing CCA at any moment of first m subframes of transmission subframes indicated by the scheduling indication information comprised in the indication message from the base station, wherein 1≤m<4, or starting implementing CCA from a starting boundary of the transmission subframe indicated by the scheduling indication information comprised in the indication message from the base station, wherein selecting the start symbol location or start and end symbol locations of the PUSCH transmission subframe from among the candidate start symbol location or candidate start and end symbol locations of the PUSCH transmission subframe according to the moment when CCA is successfully implemented comprises: determining a candidate start symbol location closest to the moment when CCA is successfully implemented as a final start symbol location of the PUSCH transmission subframe, or determining the candidate start symbol location closest to the moment when CCA is successfully implemented as the final start symbol location of the PUSCH transmission subframe and determining a final end symbol location according to the final start symbol location.

7. The method of claim 6, after implementing CCA, further comprising:

when the moment when CCA is successfully implemented does not reach a closest candidate start symbol location, sending an occupancy signal or a Reference Signal (RS), wherein the RS comprises at least one of a preamble, a DMRS or a Sounding Reference Signal (SRS), and the occupancy signal or the RS is used by the base station to perform at least one of demodulating a PUSCH or notifying the base station or another terminal that the channel has been occupied.

8. The method of claim 1, wherein sending the UL data according to the determined start symbol location or start and end symbol locations comprises:

determining a number of symbols, arranged for data transmission, of the PUSCH transmission subframe; and sending the UL data according to the determined number of symbols.

9. The method of claim 8, wherein an UL data Transport Block Size (TBS) of an incomplete subframe corresponding to a start symbol is determined through at least one of the following ways:

determining Physical Resource Blocks (PRBs) and modulation and coding information parameter $I_{MCS}$ both corresponding to the incomplete subframe corresponding to the start symbol according to the scheduling indication information comprised in the indication message received from the base station, and determining the TBS corresponding to the incomplete subframe corresponding to the start symbol according to the determined PRBs and parameter $I_{MCS}$; or determining PRBs and modulation and coding information parameter $I_{MCS}$ corresponding to a complete subframe according to the scheduling indication information comprised in the indication message received from the base station, and determining the TBS corresponding to the incomplete subframe according to the determined PRBs, conversion rule and parameter $I_{MCS}$ corresponding to the complete subframe.

10. The method of claim 9, wherein the conversion rule comprises at least one of the following rules:

when the start symbol location of the PUSCH transmission subframe is the symbol 7, the TBS corresponding to the incomplete subframe is determined according to the number of the PRBs that is a half of the number of PRBs indicated in the scheduling indication signaling and according to $I_{MCS}$ indicated by the scheduling indication signaling;

when the start symbol location of the PUSCH transmission subframe is the symbol 3, the TBS corresponding to the incomplete subframe is determined according to an integral number of PRBs obtained by rounding up or rounding down 7/12 of the PRBs indicated in the scheduling indication signaling and $I_{MCS}$ indicated in the scheduling indication signaling;

when the start symbol location of the PUSCH transmission subframe is the symbol 1 or the symbol 2, the TBS corresponding to the incomplete subframe is determined according to the number of the PRBs indicated in the scheduling indication signaling and $I_{MCS}$ indicated in the scheduling indication signaling; or a TBS determined according to m/12 of the PRBs indicated in the scheduling indication signaling and $I_{MCS}$ indicated in the scheduling indication signaling is determined as a temporary TBS and then a TBS closest to the temporary TBS is found from a TBS table as the TBS corresponding to the incomplete subframe, wherein m is a number of symbols, arranged for data transmission, in the incomplete subframe.

11. The method of claim 1, wherein when the PUSCH transmission subframe is a periodic or aperiodic Sounding Reference Signal (SRS) transmission subframe, the SRS is located on a last symbol of a first time slot of the PUSCH, or a first symbol or last symbol or second last symbol of a second time slot of the PUSCH.

12. The method of claim 11, wherein when at least one of the SRS or the UCI is transmitted on an incomplete subframe in the PUSCH transmission subframe, a resource location corresponding to at least one of the SRS or the UCI is punched during service data resource mapping.

13. The method of claim 1, wherein when Uplink Control Information (UCI) and service data are multiplexed on the same subframe for transmission, resource mapping comprises at least one of the following:
when the start symbol location of the PUSCH transmission subframe is the symbol 7, a calculation of a PRB resource mapping index of the UCI starts from the second time slot; or
when the start symbol location of the PUSCH transmission subframe is the symbol 3, at least one of an Acknowledgment (ACK) or Negative Acknowledgment (NACK) of the UCI starts to be mapped from the symbol 4 and is mapped onto part of Resource Blocks (RBs) of the PUSCH of the symbol 4 and the symbol 6 and part of RBs of the PUSCH of the symbol 9 and symbol 11 of the second time slot; a Rank Indicator (RI) in the UCI starts to be mapped from the symbol 3 and is mapped onto the symbol 3, the symbol 7 and part of PRBs of the PUSCH in the symbol 8 and the symbol 12; at least one of a Channel Quality Indicator (CQI) or Precoding Matrix Indicator (PMI) in the UCI starts to be mapped from a location of a first PRB of PRBs on the symbol 3, which are indicated by the scheduling indication information from the base station.

14. The method of claim 13, wherein when at least one of the SRS or the UCI is transmitted on an incomplete subframe in the PUSCH transmission subframe, a resource location corresponding to at least one of the SRS or the UCI is punched during service data resource mapping.

15. A method for receiving Uplink (UL) data, comprising:
sending an indication message to a terminal, wherein the indication message is arranged to indicate at least one of the following: a candidate start symbol location or candidate start and end symbol locations of a Physical Uplink Shared Channel (PUSCH) transmission subframe of a terminal on an unlicensed carrier, or a transmission subframe;
determining a start symbol location or start and end symbol locations, selected by the terminal according to the indication message, of the PUSCH transmission subframe; and
receiving UL data according to the start symbol location or start and end symbol locations, selected by the terminal, of the PUSCH transmission subframe;
wherein determining the start symbol location or start and end symbol locations, selected by the terminal according to the indication message, of the PUSCH transmission subframe comprises:
determining the start symbol location or start and end symbol locations, according to a DeModulation Reference Signal (DMRS) sent by the terminal; wherein the terminal generates the DMRS and maps the generated DMRS onto a symbol corresponding to the PUSCH transmission subframe corresponding to the start symbol location;
wherein when the start symbol location of the PUSCH transmission subframe is the symbol 7, a symbol location to which the DMRS is mapped is the symbol 10; when the start symbol location of the PUSCH transmission subframe is the symbol 3, the symbol location to which the DMRS is mapped is the symbol 3 and the symbol 10 or the symbol location to which the DMRS is mapped is the symbol 6 and the symbol 10; when the start symbol location of the PUSCH transmission subframe is the symbol 1, the symbol location to which the DMRS is mapped is the symbol 3 and the symbol 10; and when the start symbol location of the PUSCH transmission subframe is the symbol 2, the symbol location to which the DMRS is mapped is the symbol 3 and the symbol 10 or the symbol 5 and the symbol 10.

16. The method of claim 15, wherein the start and end symbol locations of the PUSCH transmission subframe comprise at least one of the following:
for a normal cyclic prefix format, the start symbol location of the PUSCH transmission subframe comprises one of symbols {0}, {1}, {0, 7}, {1, 7}, {2, 7} or {0, 3, 7, 10} and the end symbol location of the PUSCH transmission subframe comprises one of symbols {5}, {6}, {13}, {12} or {7, 13}; or,
for an extended cyclic prefix format, the start symbol location of the PUSCH transmission subframe comprises one of symbols {0}, {1}, {0, 6}, {1, 6}, {2, 6} or {0, 2, 6, 8} and the end symbol location of the PUSCH transmission subframe comprises one of symbols {4}, {5}, {11}, {10} or {5, 11}.

17. The method of claim 15, wherein the indication message comprises at least one of scheduling indication information, signaling indication information, a Radio Resource Control (RRC) message or Downlink Control Information (DCI).

18. The method of claim 15, wherein
determining the start symbol location or start and end symbol locations, selected by the terminal, of the PUSCH transmission subframe, is further in at least one of the following manners: blind detection, or determination through an occupancy signal or Reference Signal (RS) sent by the terminal.

19. A device for sending Uplink (UL) data, comprising:
a memory storing processor-executable instructions; and
a processor arranged to execute the stored processor-executable instructions to perform steps of:
determining a start symbol location or start and end symbol locations of a Physical Uplink Shared Channel (PUSCH) transmission subframe on an unlicensed carrier through a predefinition or according to an indication message received from a base station; and
sending the UL data according to the determined start symbol location or start and end symbol locations;
wherein before sending the UL data according to the determined start symbol location or start and end symbol locations, the processor is further arranged to execute the stored processor-executable instructions to perform steps of:

generating a DeModulation Reference Signal (DMRS); and mapping the generated DMRS onto a symbol corresponding to the PUSCH transmission subframe corresponding to the start symbol location;

wherein when the start symbol location of the PUSCH transmission subframe is the symbol 7, a symbol location to which the DMRS is mapped is the symbol 10; when the start symbol location of the PUSCH transmission subframe is the symbol 3, the symbol location to which the DMRS is mapped is the symbol 3 and the symbol 10 or the symbol location to which the DMRS is mapped is the symbol 6 and the symbol 10; when the start symbol location of the PUSCH transmission subframe is the symbol 1, the symbol location to which the DMRS is mapped is the symbol 3 and the symbol 10; and when the start symbol location of the PUSCH transmission subframe is the symbol 2, the symbol location to which the DMRS is mapped is the symbol 3 and the symbol 10 or the symbol 5 and the symbol 10.

* * * * *